(12) United States Patent
Wolberg-Stok et al.

(10) Patent No.: US 9,027,109 B2
(45) Date of Patent: May 5, 2015

(54) METHODS AND SYSTEMS FOR ACCESSING ACCOUNT INFORMATION ELECTRONICALLY

(71) Applicant: Citibank, N.A., New York, NY (US)

(72) Inventors: Andres Wolberg-Stok, Weston, FL (US); Sonia Olivo Alfieri, Jackson Heights, NY (US); Dominic Varacalli, Cincinnati, OH (US); Syed Rahat, Mason, OH (US); Wayne Browning, Loveland, OH (US)

(73) Assignee: Citibank, N.A., New York, NY (US)

( * ) Notice: Subject to any disclaimer, the term of this patent is extended or adjusted under 35 U.S.C. 154(b) by 100 days.

(21) Appl. No.: 13/780,666

(22) Filed: Feb. 28, 2013

(65) Prior Publication Data

US 2014/0245419 A1   Aug. 28, 2014

(51) Int. Cl.
*G06F 21/44* (2013.01)
*H04W 12/06* (2009.01)
*G06Q 20/32* (2012.01)

(52) U.S. Cl.
CPC .............. *G06F 21/44* (2013.01); *H04W 12/06* (2013.01); *G06Q 20/3221* (2013.01)

(58) Field of Classification Search
CPC .................................. G06F 21/00; H04L 9/00
USPC ............................................................ 726/9
See application file for complete search history.

(56) References Cited

U.S. PATENT DOCUMENTS

| 7,720,750 | B2 | 5/2010 | Brody et al. |
| 8,233,925 | B1 | 7/2012 | Boyle et al. |
| 2006/0015743 | A1 | 1/2006 | Camaisa et al. |

(Continued)

FOREIGN PATENT DOCUMENTS

| WO | WO 01/61662 | * | 8/2001 |
| WO | WO 01/61662 A2 | | 8/2001 |
| WO | WO 2010/110648 A2 | | 9/2010 |

OTHER PUBLICATIONS

Gonçalves et al., "How About an App Store? Enablers and Constraints in Platform Strategies for Mobile Network Operators," IEEE $9^{th}$ International Conference on Mobile Business, $9^{th}$ Global Mobility Roundtable International Conference, Jun. 13-15, 2010, pp. 66-73.

(Continued)

*Primary Examiner* — Jeffrey Pwu
*Assistant Examiner* — Samuel Ambaye
(74) *Attorney, Agent, or Firm* — John M. Harrington; Johnson, Marcou & Isaacs, LLC

(57) ABSTRACT

Methods and systems for accessing customer account information involve, for example, binding a computing device with a customer's profile via one or more attributes of the computing device and an encrypted token stored on the computing device and thereafter receiving an authentication request consisting at least in part of the computing device attributes and the encrypted token stored on the computing device. A determination is made as to whether or not entry of a customer credential was received within a pre-determined preceding interval of time, and predefined customer account information is displayed on the computing device without requiring entry of the customer credential when a determination is made that entry of the customer credential was received within the pre-determined preceding interval of time.

22 Claims, 12 Drawing Sheets

| | INFORMATION TYPE | CARD | CHECKING | SAVINGS |
|---|---|---|---|---|
| 100 | BALANCE: OUTSTANDING BALANCES AND AVAILABLE CREDIT LINE | LAST 4 DIGITS OF ACCOUNT NUMBER; CURRENT BALANCE; AMOUNT AVAILABLE | LAST 4 DIGITS OF ACCOUNT NUMBER; ON DEPOSIT; AVAILABLE NOW | LAST 4 DIGITS OF ACCOUNT NUMBER; ON DEPOSIT; AVAILABLE NOW; YTD INTEREST |
| 108 | STATEMENT: CREDIT CARD ACCOUNT DETAILS | LAST 4 DIGITS OF ACCOUNT NUMBER; MINIMUM DUE; DUE DATE; STATEMENT BALANCE | | |
| 110 | HISTORY: RECENT TRANSACTIONS | LAST 4 DIGITS OF ACCOUNT NUMBER; 15 MOST RECENT TRANSACTIONS INCLUDING DATE, LOCATION AND AMOUNT | LAST 4 DIGITS OF ACCOUNT NUMBER; 15 MOST RECENT TRANSACTIONS INCLUDING DATE, LOCATION AND AMOUNT | LAST 4 DIGITS OF ACCOUNT NUMBER; 15 MOST RECENT TRANSACTIONS INCLUDING DATE, LOCATION AND AMOUNT |

(56) References Cited

U.S. PATENT DOCUMENTS

| | | |
|---|---|---|
| 2006/0218630 A1 | 9/2006 | Pearson et al. |
| 2007/0050292 A1 | 3/2007 | Yarbrough |
| 2007/0136586 A1 | 6/2007 | Barrett |
| 2007/0143825 A1* | 6/2007 | Goffin ................................ 726/2 |
| 2008/0040214 A1 | 2/2008 | Kahn et al. |
| 2009/0199264 A1 | 8/2009 | Lang |
| 2010/0017596 A1* | 1/2010 | Schertzinger ................ 713/155 |
| 2010/0281268 A1 | 11/2010 | Barreto et al. |
| 2011/0010761 A1* | 1/2011 | Doyle ................................ 726/5 |
| 2011/0016029 A1 | 1/2011 | King et al. |
| 2011/0295749 A1 | 12/2011 | Scalisi |
| 2012/0095838 A1 | 4/2012 | Broumand |
| 2012/0136783 A1 | 5/2012 | Pousti |
| 2012/0191557 A1* | 7/2012 | Fisher et al. .................... 705/21 |
| 2012/0203689 A1 | 8/2012 | Parvis |
| 2012/0232982 A1 | 9/2012 | Durvasala |
| 2012/0265587 A1 | 10/2012 | Kinkead |
| 2013/0042314 A1* | 2/2013 | Kelley ................................ 726/9 |

OTHER PUBLICATIONS

Ip.com et al., "Managing Transaction Billing Across a Plurality of Billing Sources Utilizing an Interface," Ip.com Prior Art Database, IPCOM000182419D, Apr. 30, 2009, pp. 1-40.

International Search Report and Written Opinion dated Jun. 17, 2014 in PCT/US2014/017901, pp. 1-11.

* cited by examiner

| INFORMATION TYPE | CARD | CHECKING | SAVINGS |
|---|---|---|---|
| BALANCE: OUTSTANDING BALANCES AND AVAILABLE CREDIT LINE | LAST 4 DIGITS OF ACCOUNT NUMBER; CURRENT BALANCE; AMOUNT AVAILABLE | LAST 4 DIGITS OF ACCOUNT NUMBER; ON DEPOSIT; AVAILABLE NOW | LAST 4 DIGITS OF ACCOUNT NUMBER; ON DEPOSIT; AVAILABLE NOW; YTD INTEREST |
| STATEMENT: CREDIT CARD ACCOUNT DETAILS | LAST 4 DIGITS OF ACCOUNT NUMBER; MINIMUM DUE; DUE DATE; STATEMENT BALANCE | | |
| HISTORY: RECENT TRANSACTIONS | LAST 4 DIGITS OF ACCOUNT NUMBER; 15 MOST RECENT TRANSACTIONS INCLUDING DATE, LOCATION AND AMOUNT | LAST 4 DIGITS OF ACCOUNT NUMBER; 15 MOST RECENT TRANSACTIONS INCLUDING DATE, LOCATION AND AMOUNT | LAST 4 DIGITS OF ACCOUNT NUMBER; 15 MOST RECENT TRANSACTIONS INCLUDING DATE, LOCATION AND AMOUNT |

Fig. 1

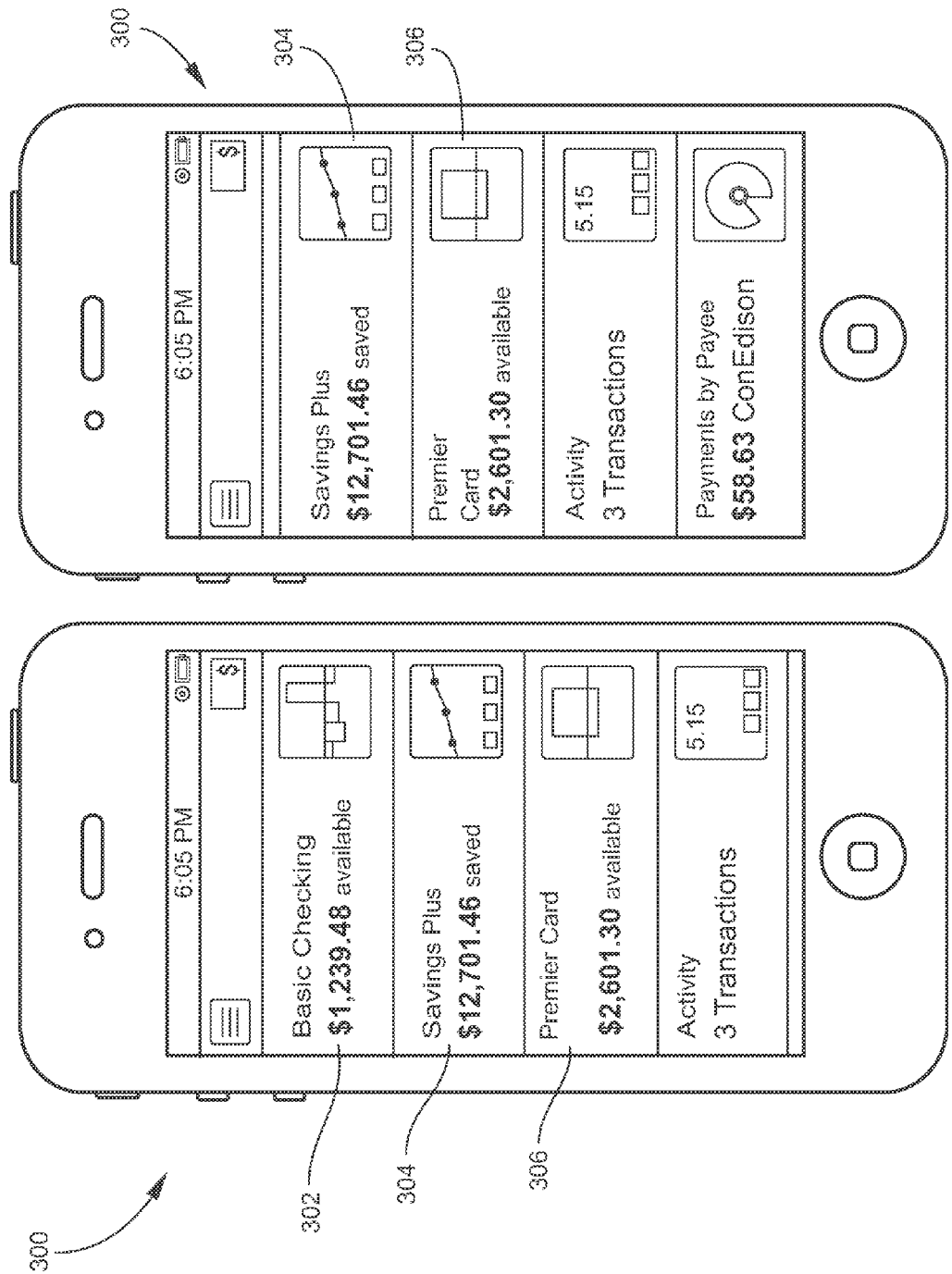

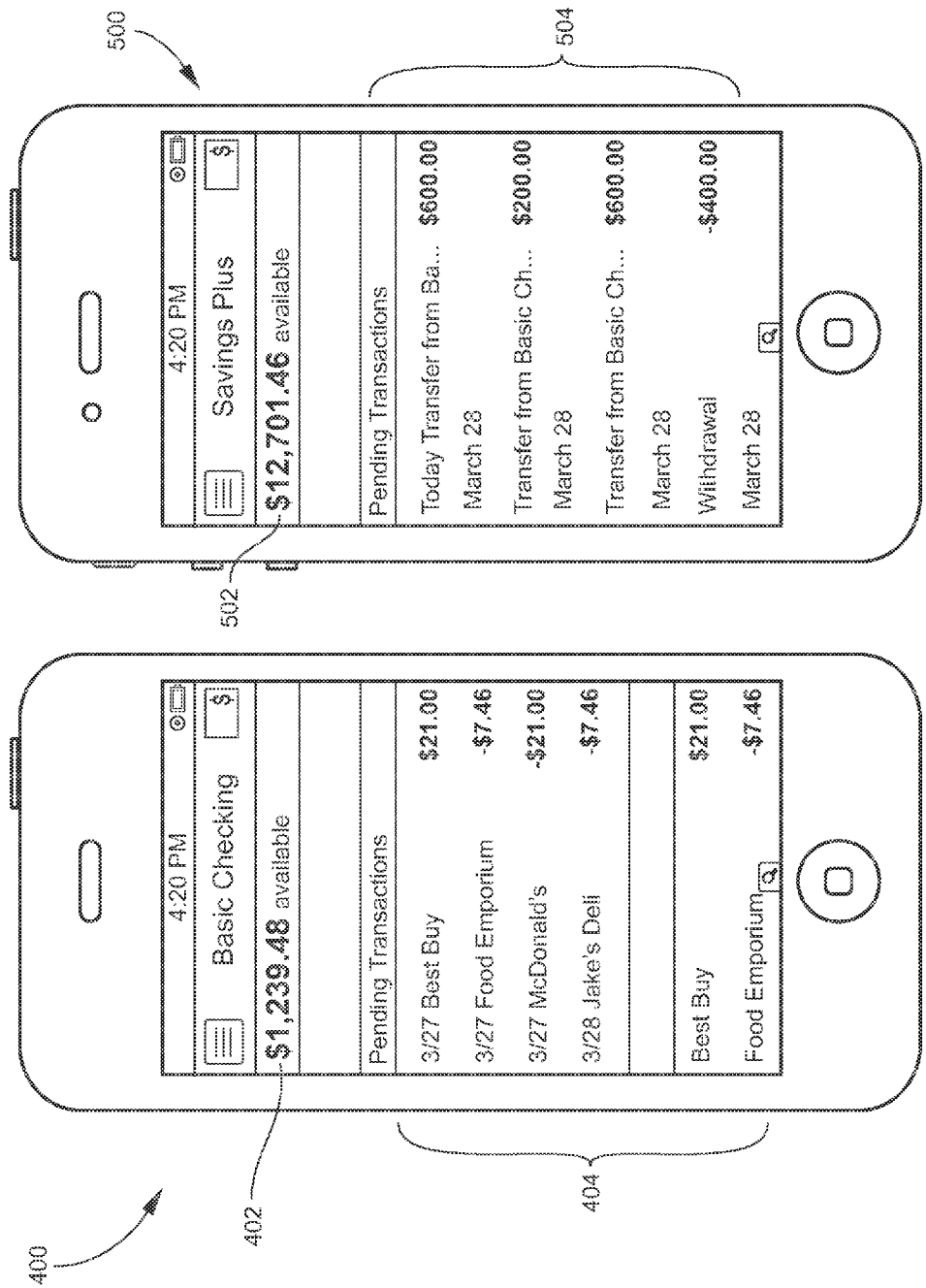

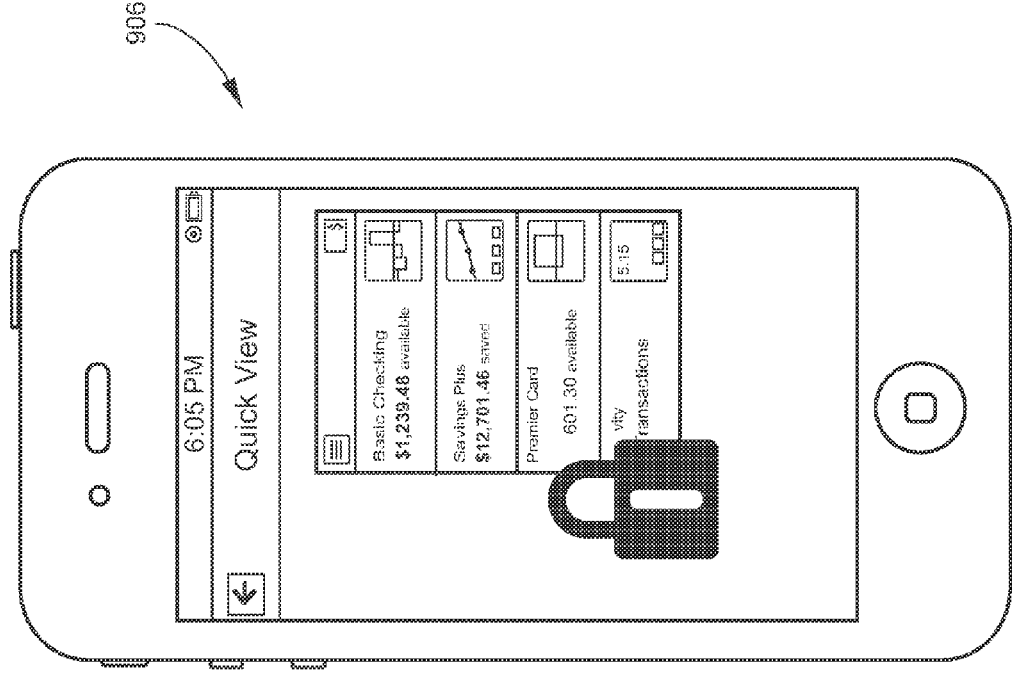
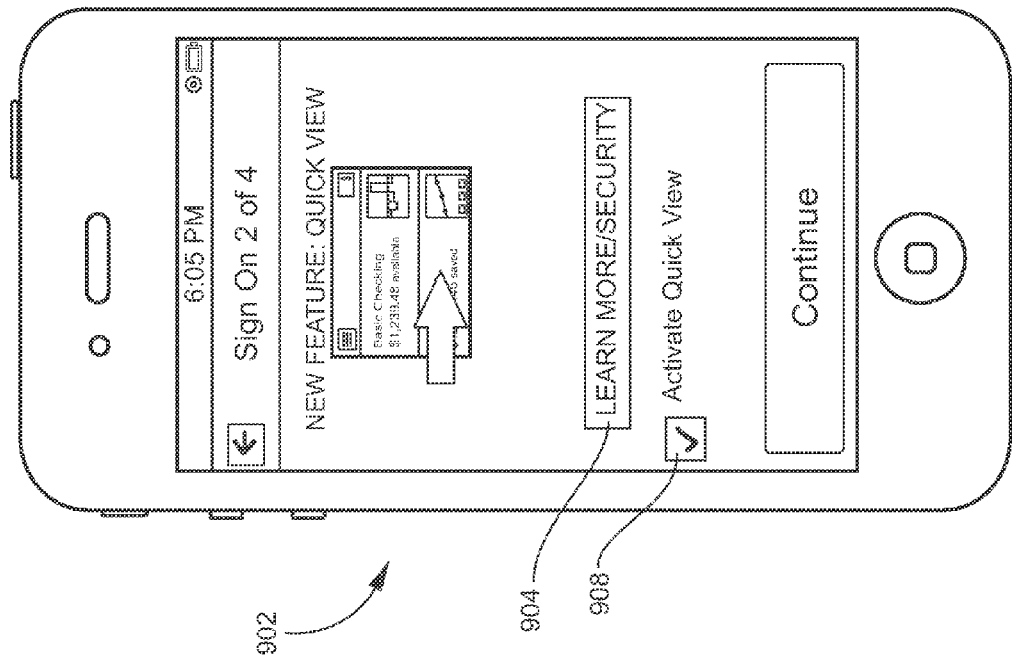

METHODS AND SYSTEMS FOR ACCESSING ACCOUNT INFORMATION ELECTRONICALLY

FIELD OF THE INVENTION

The present invention relates generally to the field of financial account information management, and more particularly to methods and systems for accessing account information electronically.

BACKGROUND OF THE INVENTION

Customers while shopping may wish from time-to-time to know exactly how much money or credit they have available in their various accounts and their most recent transactions. Currently, bank customers who wish to obtain such information through a mobile device are typically required to go through an authentication process, which usually requires entry of a user ID and password each time such customers access the information. Some bank customers may be allowed to access the information on a mobile device using the same user ID and password that they use for online banking, but other customers may be required to use a different user ID and password for mobile device access to their balance and recent transaction information.

In either case, a customer shopping, for example, at a mall who may want to make relatively frequent checks on his or her balances to assure sufficient funds or credit to pay for purchases. This requires repeated typing of the customer's user name and password on his or her mobile device. Moreover, most financial institutions set standards for customer passwords that require unusual characters that may further complicate the process of typing passwords on a customer's mobile device. Thus, typing a password on a small keyboard or touchscreen of a mobile device may be awkward and time consuming.

In the past, financial institutions have made relatively modest improvements for customer convenience, such as, allowing a customer an option to keep a session open for a limited period of time after signing on using his or her user ID and password. Thus, the customer may be allowed to extend the length of a session slightly beyond the period of time normally allocated for a session after the customer signs on. In addition, some financial institutions have moved toward allowing access to limited aspects of a customer's account information without entering a password. However, such offerings carry a significant degree of risk such as exposing the customer's account information to unauthorized persons.

There is a present need for methods and systems for accessing account information electronically that provide a high level of convenience for on-the-go customers of financial institutions, such as banks, who wish to learn quickly and easily how much money or credit they have in their accounts without repeatedly going through complicated sign-on processes, while at the same time providing a number of controls to ensure that the security of customers' information is safely maintained.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods and systems described herein. Embodiments of the invention provide methods and systems for accessing account information electronically that may involve, for example, binding, using a processor of a back-end server, a computing device with a customer's profile via at least one attribute of the computing device and an encrypted token stored on the computing device.

Thereafter, using the processor of the back-end server, an authentication request may be received that consists at least in part of the at least one attribute of the computing device and the encrypted token stored on the computing device. Likewise using the processor of the back-end server, a determination may be made as to whether or not entry of a customer credential was received within a pre-determined preceding interval of time. Also using the processor of the back-end server, predefined customer account information may be displayed on the computing device without requiring entry of the customer credential when a determination is made that entry of the customer credential was received within the pre-determined preceding interval of time.

In an aspect of embodiments of the invention, binding the computing device may involve, for example, binding the computing device with the customer's profile only when an opt in selection is received from the customer. In another aspect, binding the computing device may involve, for example, binding the computing device only if a confirmation of the opt in selection is received from the customer. In a further aspect, binding the computing device may involve, for example, disabling the binding of the computing device at any time an opt out selection is received from the customer after receiving the opt in selection from the customer.

In an additional aspect of embodiments of the invention, binding the computing device may involve, for example, disabling the binding of the computing device at any time a request to change the customer credential is received from the customer. In still another aspect, the customer credential may comprise, for example, a customer password. In a still further aspect, binding the computing device may involve, for example, disabling the binding of the computing device at any time a request is received to bind a different computing device with the customer's profile.

In another aspect of embodiments of the invention, the at least one computing device attribute may comprise, for example, a unique computing device identifier. In other aspects, the computing device may comprise, for example, a mobile communication device and the at least one computing device attribute may comprise a mobile network identifier. In further aspects, the encrypted token may comprise, for example, a token encrypted using a hash algorithm.

In a further aspect of embodiments of the invention, determining whether or not entry of the customer credential was received may involve, for example, determining whether or not entry of the customer credential was received at least once within the pre-determined preceding interval of time. In additional aspects, determining whether or not entry of the customer credential was received may involve, for example, determining whether or not entry of the customer credential was received at least once within the preceding fifteen days.

In a still further aspect of embodiments of the invention, displaying the pre-defined customer account information may involve, for example, displaying non-personally identifiable customer account information on the computing device. In another aspect, displaying the non-personally identifiable customer account information may involve, for example, displaying non-personally identifiable customer checking, savings, and credit card account information on the computing device. In other aspects, displaying the non-personally identifiable customer checking account information may involve, for example, displaying a partial checking account identifier and one or more available balances of the checking account on the computing device. In still other aspects, the partial checking account identifier may comprise, for example, a pre-determined portion of a checking account number In still another aspect of embodiments of the invention, displaying the non-personally identifiable customer savings account information may involve, for example, displaying a partial savings account identifier and one or more savings account balances on the computing device. In an additional aspect, the partial savings account identifier may comprise, for example, a pre-determined portion of a savings account number. In a further aspect, displaying the non-personally identifiable customer credit card account information may involve, for example, displaying a partial credit card account identifier, one or more credit card account balances, on the computing device. In yet another aspect, the partial credit card account identifier may comprise, for example, a pre-determined portion of a credit card account number.

In an additional aspect of embodiments of the invention, displaying the non-personally identifiable customer account information may involve, for example, displaying non-personally identifiable customer account transaction information for a pre-determined number of transactions on the computing device. In a further aspect, the pre-determined number of transactions may comprise, for example, the most recent fifteen transactions. In a still further aspect, displaying the pre-defined customer account information may involve, for example, denying a customer transaction request received without entry of the customer credential.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 1 is a chart that illustrates examples of the types of information that may be accessible via the sneak peak application for embodiments of the invention;

FIGS. 3A and 3B are screen shots illustrating examples of the home screen of the sneak peak application for embodiments of the invention;

FIGS. 4 and 5 are screen shots illustrating examples of a checking ledger view and a savings ledger view of the sneak peak application for embodiments of the invention;

FIGS. 9A-9D are screen shots illustrating examples of aspects of a sneak peek sign-on screen for embodiments of the invention;

DETAILED DESCRIPTION

Figure 2:
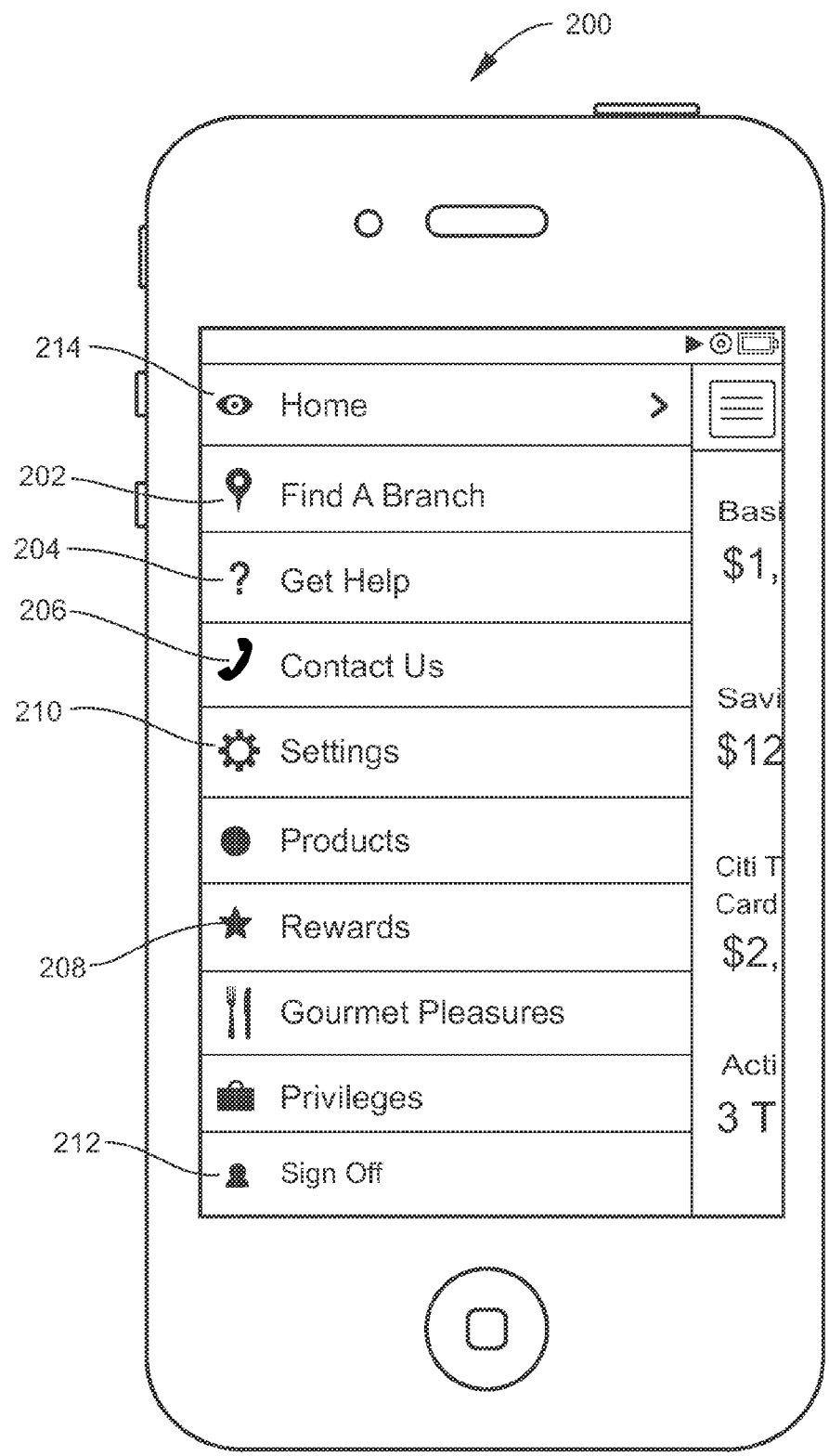
FIG. 2 is a screen shot that illustrates an example of menu items accessible upon opening the sneak peak application for embodiments of the invention without entering the customer's password.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide an unprecedented level of convenience for on-the-go customers of financial institutions, such as banks, who wish to learn quickly and easily how much money they have in their accounts without repeatedly going through complicated sign in processes, while at the same time providing a number of controls to ensure that the security of customers' information is safely maintained. Embodiments of the invention allow financial institution customers to see at a glance, for example, their current balances on all their deposit accounts and credit cards and to see how much money they have available to spend without being required to enter their passwords each time they access such information. In addition, embodiments of the invention allow such customers to see their latest transactions likewise without having to enter their passwords each time. Instead of typing in the customer's password to access the latest information on his or her mobile device each time, embodiments of the invention merely require the customer to periodically refresh and reopen an application on the mobile device.

Thus, embodiments of the invention provide a "sneak peek" mode within a global mobile application that allows an "always-on" sneak peek at balances and recent transactions to a customer each time the customer enters the application, for example, on the customer's mobile device. In embodiments of the invention, only information that is non-personally identifiable is made available, and such information is made available only to a customer who opts in to the sneak peek service and continues to successfully enter the customer's password in the sneak peak application at least once during predetermined time intervals, such as at least once every fifteen days.

An important aspect of embodiments of the invention requires that a customer must opt in to assure that the customer wishes to participate. In an "opt-in-only" aspect, for example, customers may be asked to opt in to the service upon first logging into the sneak peak application for embodiments of the invention. Thereafter, customers may be able to change their sneak peek opt-in/out status at any time via a settings menu. Thus, when a customer signs on for the first time, the customer is advised of the features for embodiments of the invention. If the customer does not opt in and sign up immediately for the sneak peek application for embodiments of the invention, the customer may be given opportunities to sign up on subsequent occasions.

A further security feature of the sneak peek application for embodiments of the invention assures, for example, that the only the type of information accessible includes account balances and a predetermined number of the most recent transactions, such as the fifteen most recent transactions. In addition, in the sneak peek mode, customers may not be allowed to perform any transactions whatsoever. No personally identifiable information may be displayed, and no one may be allowed to perform any money movement of any kind from within the sneak peak application for embodiments of the invention without entering the customer's password.

If a customer opts in and signs up for the sneak peek application for embodiments of the invention, he or she may thereafter be able to access certain of the customer's account information via his or her mobile device without having to input the customer's password. Thus, embodiments of the invention enable the customer to see, for example, checking account information including account name and one or more available balances, savings account information including account name and one or more available balances, and credit card information including card name and one or more card balances, as well as merchant offers for customers with a financial institution credit card account.

FIG. 1 is a chart that illustrates examples of the types of information that may be accessible via the sneak peak application for embodiments of the invention. Referring to FIG. 1, the balance information 100 that may be accessed using the sneak peak functionality may include, for example, the last four digits of account number, the current balance, and the available credit line for the customer's card account 102; the last four digits of the account number, the on-deposit amount, and the amount available for the customer's checking account 104; and the last four digits of the account number, the on-deposit amount, the amount available, and the year-to-date interest for the customers' savings account 106. Referring further to FIG. 1, the statement information 108 that may be accessed using the sneak peak functionality may include, for example, the statement balance, minimum payment due, and due date for the customer's card account 102.

Referring again to FIG. 1, the account history information 110 that may be accessed using the sneak peak functionality may include, for example, up to the most recent fifteen transactions involving any of the customer's card 102, checking 104 or savings 106 accounts. The mobile application for embodiments of the invention provides customers a truly differentiated mobile banking experience, leveraging dynamic ways for the customer to engage and access the customer's financial information. Allowing customers who opt in to the ability to access high level, non-personally identifiable account information takes advantage of the nature of the mobile phone that is generally on or about the person of the mobile phone user most of each day and is a personal device that is not generally shared between users.

A customer who opts in to use of the sneak peek application for embodiments of the invention may have access to various functionality upon opening the application without entering the customer's password each time. FIG. 2 is a screen shot 200 that illustrates an example of menu items accessible upon opening the sneak peak application for embodiments of the invention without entering the customer's password. Referring to FIG. 2, full functionality menu items accessible to a customer upon opening the sneak peek application for embodiments of the invention without entering a password may include, for example, branch locator 202, help with frequently asked questions 204, contact the financial institution 206, and a display of accumulated rewards points 208. However, the customer may not be enabled to update settings using the settings button 210 while in the sneak peek application for embodiments of the invention. A sign on/sign off menu item 212 enables the customer to sign on by entering the customer's password, whereupon the customer is enabled to access the full sneak peak application and perform additional activities, such as payments, transfers, deposit checks and view all transactions.

A home screen menu item 214 shown on the screen shot of FIG. 2 may allow the customer to access a home screen upon opening the sneak peak application for embodiments of the invention without entering the customer's password. FIGS. 3A and 3B are screen shots illustrating examples of the home screen 300 of the sneak peek application for embodiments of the invention. The home screen 300 provides access with available balance information for all account types including, for example, checking 302, savings 304 and credit card 306. For checking accounts 302, the home screen 300 may provide the account name and one or more available balances. For savings accounts 304, the home screen 300 may provide the account name and one or more available balances. For credit card accounts 306, the home screen 300 may provide the card name and one or more credit card balances.

FIGS. 4 and 5 are screen shots illustrating examples of a checking ledger view 400 and a savings ledger view 500, respectively, accessible upon opening the sneak peek application for embodiments of the invention without having to re-enter the customer's password each time the customer accesses the information using the sneak peek application. The checking and savings ledger views 400 and 500, respectively, may provide, for example, one or more available balances 402, one or more available balances 502, and transaction information for a predetermined number, such as fifteen, of the most recent pending and posted checking account transactions 404 and savings account transactions 504. The checking and savings account transaction information displayed may include, for example, the transaction amount, the transaction description, and the date for each transaction. It is to be noted that embodiments of the invention are not limited to numeric displays of recent transaction and balance information. Visual representations of the same information or any other suitable representations of such information may be employed. According to embodiments of the invention, the account information is not personally identifiable, and no further account details are accessible without entering the customer's password.

Figure 6:
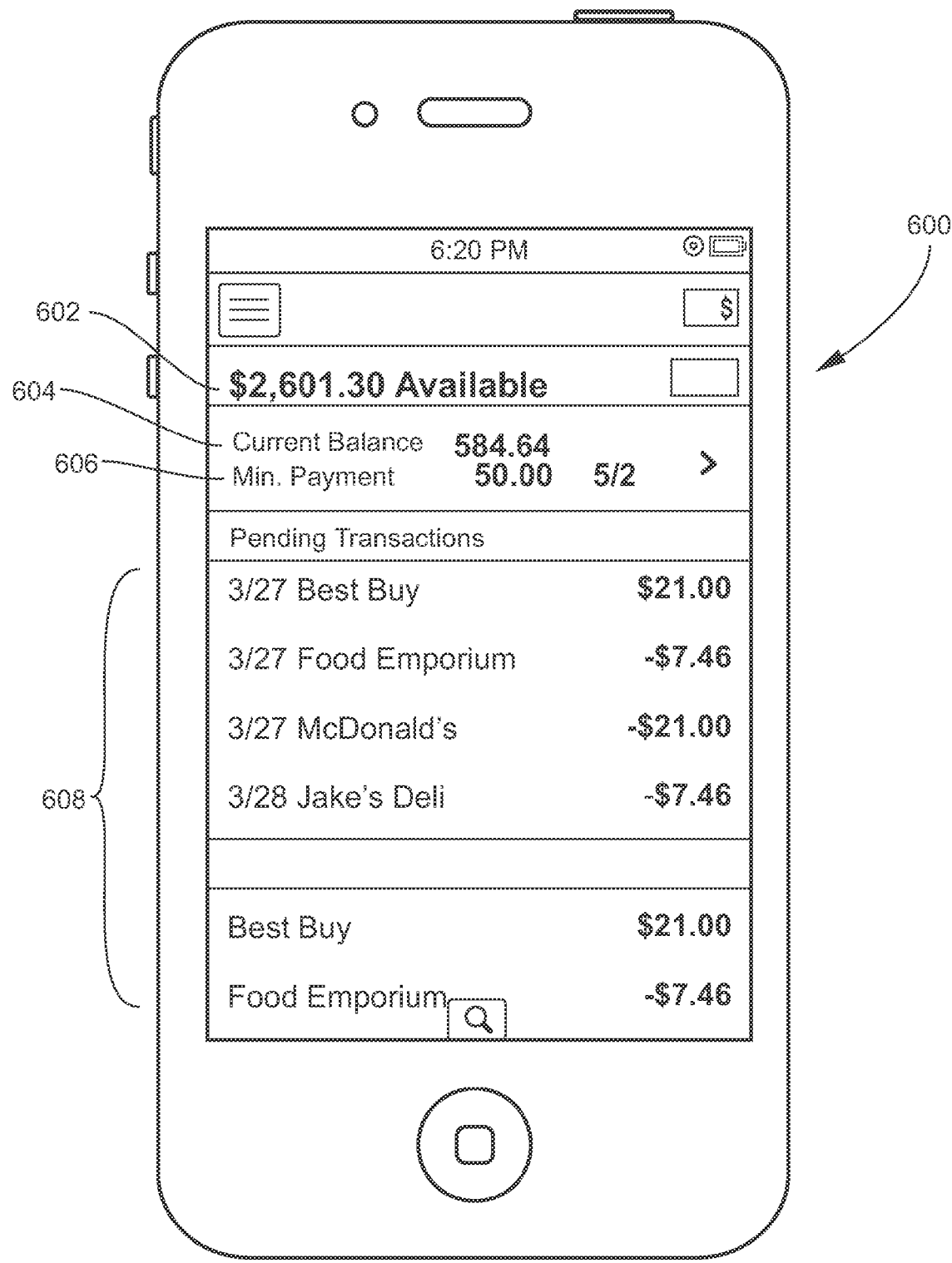
FIG. 6 is a screen shot illustrating an example of a credit card ledger view of the sneak peak application for embodiments of the invention.
Figure 7:
FIG. 7 is a screen shot illustrating an example of an offer based on a customer's card relationship for embodiments of the invention.

FIG. 6 is a screen shot illustrating an example of a credit card ledger view 600 accessible upon opening the sneak peek application for embodiments of the invention without having to re-enter the customer's password each time the customer accesses the information using the sneak peek application. The credit card ledger view 600 may provide, for example, the available balance 602, the current balance 604, the minimum payment amount and due date 606, and the transaction information 608 for a predetermined number, such as fifteen, of the most recent pending and posted transactions. The displayed credit card transaction information 608 may include, for example, the amount, transaction description, and purchase date for each transaction. In the credit card ledger view 600 for embodiments of the invention, no further transaction details or account details are made available. As previously mentioned, customers with credit card accounts may also be able to see offers that are available to them based on their specific card relationship. FIG. 7 is a screen shot illustrating an example of an offer 700 based on a customer's card relationship.

As previously noted, embodiments of the invention provide a number of control aspects to ensure that the security of customers' information is safely maintained. In a confirmation of selections aspect, each time a customer reboots the customer's mobile device, updates the application, or enters the customer's password after expiration of a 15-day period of not doing so, the customer may be reminded of the customer's security preferences and asked to reconfirm his or her preferences in order to proceed. The confirmation of selections aspect ensures that a customer is familiar with and aware of the customer's security preferences. A persistent opt-out option, which is the persistent ability to opt out of the sneak peak application functionality for embodiments of the invention via the settings menu displayed by the application, is still another aspect. Thus, a customer may be allowed to opt out of the features for embodiments of the invention and will not be prompted in the future to opt in to such features.

In addition, a customer who opts in may disable the sneak peak feature for embodiments of the invention by logging in via any other computing device, including a mobile device, and changing the customer's online password. For example, assume that a customer who opts in loses his or her mobile device and is concerned about security even though an unauthorized third party will not be able to access any of the customer's personally identifiable account information using the customer's mobile device. Such a concern is addressed, for example, by allowing the customer to immediately disable the features of the sneak peek application for embodiments of the invention by allowing the customer to change the customer's online password.

Bank and cards customer service agents may be able to provide guidance to customers who have lost their phones or have had their wallets stolen. For example, customers who call in may be directed to an online banking sneak peak application to change their passwords to remotely disable the application functionality for embodiments of the invention. Thus, customers may be able to remotely disable the sneak peak application functionality remotely by accessing an online banking server using a different touchpoint and simply changing the customer's password. Alternatively, a customer service representative may be able to disable a customer's user ID at the customer's request. In addition, a customer whose mobile device has a "find my phone" feature may enable the "find my phone" feature on the customer's device and remotely lock his or her device with a passcode if misplaced, and customers may remotely wipe their mobile devices as well.

In another aspect, any changes to the customer's credentials for online banking may disable the sneak peek functionality and require the customer to enter his or her password upon opening the sneak peek application. For password changes, a customer may not be prompted to proceed through the sneak peek opt in flow, but may instead be prompted to verify his or her customer settings around the customer's remembered user ID and sneak peek settings. For user ID changes, the customer may be prompted to proceed through the full sneak peek opt in flow for the sneak peek functionality.

In an additional security aspect, as previously mentioned, customers are required to enter their password at least once in pre-determined time intervals, such as once every fifteen days, in order for the functionality of the sneak peak application for embodiments of the invention to remain active. It is to be understood that such periodic schedule for re-entering the customer's password is not limited to once every fifteen days but may be any other number of re-entries and any other suitable interval of time. For example, if a customer opts in to the functionality of the sneak peak application, but then does not enter his or her password for fifteen days by either performing a transaction, viewing information that requires the customer to enter his or her password, or by actively electing to electronically sign on via an application menu, the next time the customer opens the application, he or she will be required to enter his or her password to fulfill the 15-day password requirement. Once the customer enters his or her password, the customer may be reminded of his or her preferences, including the customer's preference to opt in for the functionality for embodiments of the invention, and may be given an opportunity to opt out if the customer's preferences have changed.

On the other hand, if the customer opts in to the sneak peak functionality and launches the application and enters the customer's password by either performing an activity that requires such entry, requests to view information that requires such entry, or actively elects to sign in via the application menu at least once every fifteen days, the customer will have satisfied the 15-day sign-in requirement. Therefore, no additional requirement to enter a password will be imposed on the customer by the sneak peak application for embodiments of the invention so long as the customer continues to satisfy this requirement at least every fifteen days.

In another security aspect, a customer is allowed to enroll in the functionality of the sneak peak application for embodiments of the invention on only one device at a time. Thus, if a customer attempts to opt in to the functionality from another device, the sneak peak application functionality may immediately be deactivated on the previously enrolled device. In addition, the customer who attempts to enroll on the other device may be presented with a notice prior to completion of enrollment on the new device advising him or her that the new enrollment will un-enroll the customer's previously enrolled device. Consequently, if a customer has two or more mobile devices from which he or she accesses his or her accounts, the customer is limited to enrolling only one of such devices for the sneak peek feature of embodiments of the invention. If the customer enrolls one of his or her such mobile devices for the sneak peek functionality and later wishes to change to another device, doing so will disable the previously enrolled device in order to enroll such other device.

In a further security aspect, any time an enrolled mobile device is rebooted or restarted or the customer upgrades or updates a previous version of the sneak peek application for embodiments of the invention, the customer is required to re-enter his or her password in order to continue to use the features of the invention. In the device reboot aspect, any time the customer reboots his or her mobile device, the next time the customer opens the sneak peek application for embodiments of the invention, the customer may be prompted to enter his or her password. In an application update aspect, any time the sneak peak application is upgraded with a newer version of the application by the customer, the customer may be asked to enter his or her password. In either aspect, upon launching the sneak peak application and entering the customer's password, the customer may be reminded of his or her preferences, including the customer's preference to opt in to the functionality for embodiments of the invention, and may be given an opportunity to opt out if the customer's preferences have changed.

Figure 8:
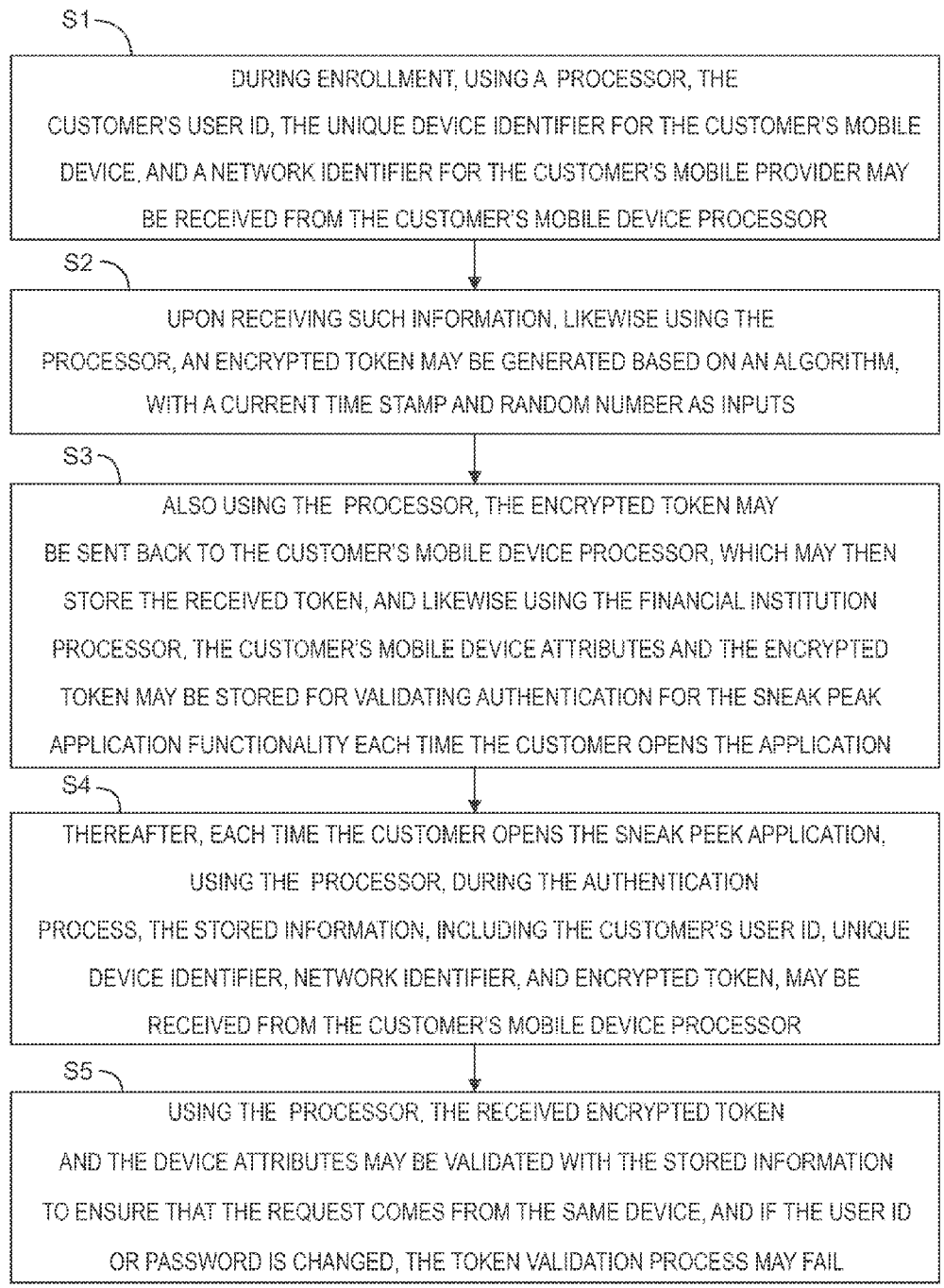
FIG. 8 is a flow diagram that illustrates an example of the process of binding the customer's mobile device to the customer's profile during sneak peek enrollment for embodiments of the invention.

An important security aspect of embodiments of the invention involves, for example, tightly binding the customer's physical device, such as the customer's mobile phone, to an individual customer profile. FIG. 8 is a flow diagram that illustrates an example of the process of binding the customer's mobile device to the customer's profile during enrollment for embodiments of the invention. Referring to FIG. 8, at S1, during enrollment, using a processor such as a financial institution processor, the customer's user ID; the unique device identifier for the customer's mobile device, such as a Media Access Control (MAC) address, International Mobile Station Equipment Identity (IMEI), or other mobile equipment identifier (MEID); and network details for the customer's mobile device processor.

Referring further to FIG. 8, at S2, upon receiving such information, likewise using the processor, an encrypted token may be generated based on an algorithm, such as the Hash-Based Message Authentication Code (HMAC), using an algorithm, such as the Secure Hash Algorithm, SHA256, with a current time stamp and random number as inputs. It is to be noted that embodiments of the invention are not limited to use of the HMAC-SHA256 algorithm and that any other suitable encryption method or algorithm may be employed. Further, embodiments of the invention may employ either symmetric or asymmetric encryption. Referring again to FIG. 8, at S3, also using the processor, the encrypted token may be sent back to the customer's mobile device processor, which may then store the received token. In addition, using the processor, the customer's mobile device attributes and the encrypted token may be stored for validating authentication for the sneak peak application functionality for embodiments of the invention each time the customer opens the application.

Thereafter, referring once more to FIG. 8, at S4, each time the customer opens the sneak peak application for embodiments of the invention, during the authentication process, using the processor, the information including, for example, the customer's user ID, the customer's unique device identifier, the customer's network details, and the encrypted token that was sent to the customer's device during the enrollment process may be received from the customer's mobile device processor. It is to be noted that the network details may be included in the token information in order to enable the financial institution to remotely disable the features for embodiments of the invention in the event the customer loses his or her mobile device. At S5, using the processor, the received encrypted token and the device attributes may be validated with the stored information to ensure that the request comes from the same device. If the user ID or password is changed, the token validation process may fail, and the customer may be notified of a requirement for the customer to proceed through a normal sign-on process using his or her password.

A network detail requirement aspect of embodiments of the invention may identify when the sneak peak application is accessed in the absence of cellular or Wi-Fi connectivity and may require re-authentication on the next occasion the application is accessed after cellular or Wi-Fi connectivity is reestablished. Still another security aspect may involve, for example, a master switch that allows the financial institution to fully disable the sneak peak service for all customers of the financial institution. In the master switch aspect, instead of disabling sneak peak functionality on a customer-by-customer basis, if any type of breach occurs that presents a need to disable the functionality of all customers, the master switch aspect may allow the financial institution to disable such functionality. A still further security aspect may involve, for example, a selective control that allows the financial institution to disable the features for embodiments of the invention for one or more customers of the financial institution on a selective basis, for example, in the event a customer's mobile device number is changed.

It is to be understood that no transaction of any type, such as a payment, a transfer or deposit involving any account of the customer, may be performed using the sneak peek features for embodiments of the invention. Thus, in order to perform one or more transactions, such as making a payment or setting up a transfer of funds between accounts of the customer, the customer must enter his or her password. If a customer accesses his or her account information using the features for embodiments of the invention and decides to make a payment, the customer must then enter his or her password to continue and make such a payment. Other actions which may require the customer to enter the customer's password may include, for example, editing or canceling scheduled payments; performing money transfer transactions; or accessing information regarding investments, retirement accounts, credit lines, loans, mortgages, brokerage accounts, or business accounts. Additional actions which may require the customer to enter the customer's password may include, for example, payment by a payee module that includes aggregate payment information by payee, mobile check deposit, access to transactions before the predetermined number of most recent transactions, or transaction or account details.

Figure 9A:
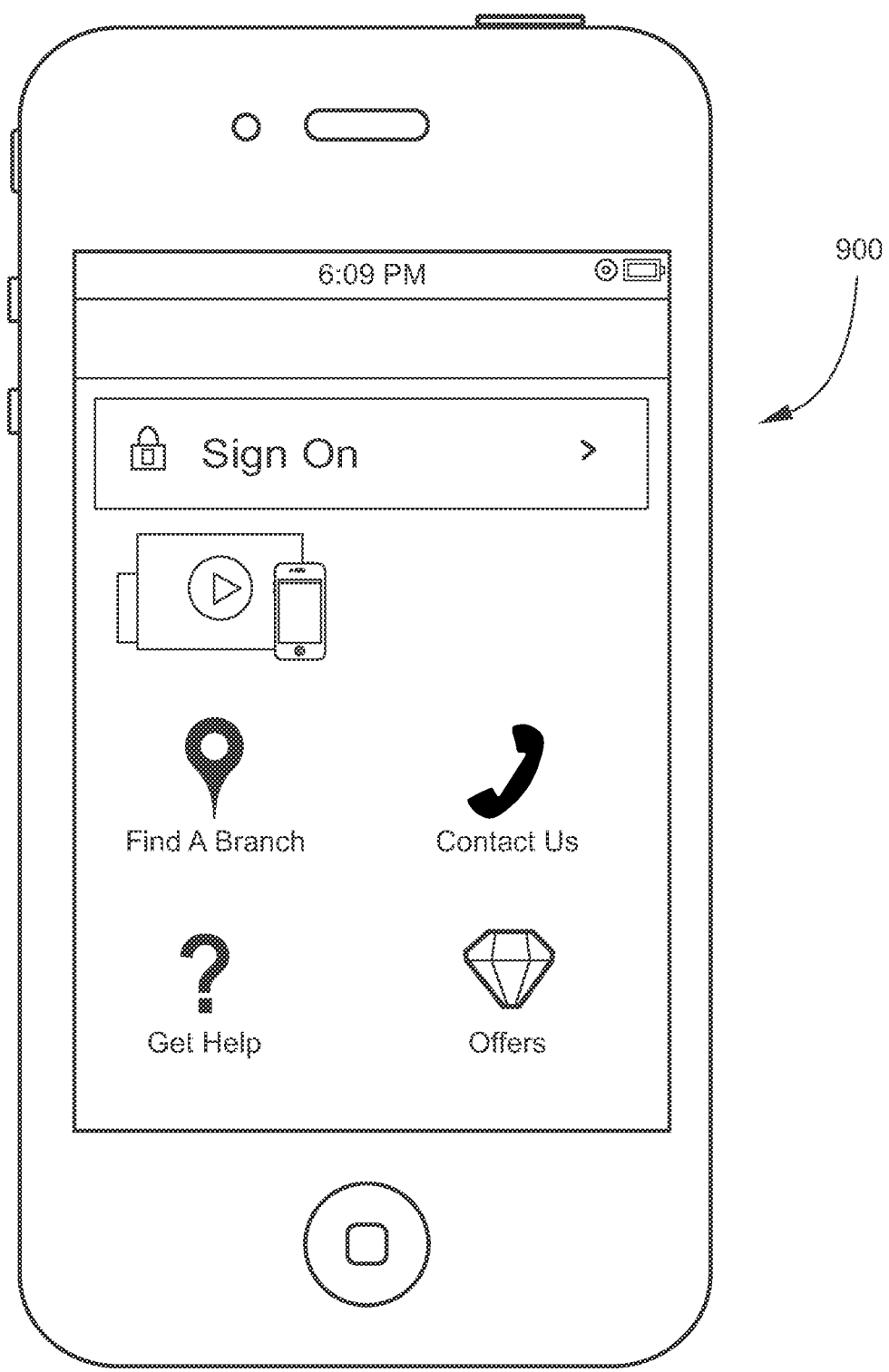

FIGS. 9A-9D are screen shots illustrating examples of aspects of a sign-on screen 900 for embodiments of the invention. Referring to FIGS. 9A-9D, in a first-time login process, upon first signing into the sneak peak application for embodiments of the invention, a customer may be taken through an initial sign-on process that may consist of a number of screen displays on the customer's mobile device once the customer correctly enters his or her user name and password. A first such screen may be a sneak peek introduction and opt in screen, an example screen shot 902 of which is shown in FIG. 9B, on which the customer may read about the sneak peak functionality. The customer may be prompted to click on a "learn more/security" link icon 904 which may take the customer to a "learn more/security" screen 906, as shown in FIG. 9C, on which the customer may learn what information may be available to him or her in the sneak peek mode. The customer may be also learn what information may require password entry to access and the risks that may be associated with enablement of the sneak peek functionality. In addition, the customer may be advised of security measures available if the customer loses his or her mobile device and wishes to disable the sneak peek feature remotely.

Referring to FIG. 9B, in the opt-in aspect of the sneak peek functionality, a default state of an "activate sneak peek" box 908 may be an unchecked condition, and the customer must actively opt in to the sneak peek functionality to activate it. If the customer opts in, and did not previously elect to have his or her user ID remembered on an earlier screen, the customer may be advised that in order for the sneak peek aspect to be functional, the customer must elect to have his or her user ID remembered. If the customer does not agree, the customer may be opted out of the sneak peek functionality and be taken directly to a home screen.

Figure 9D:
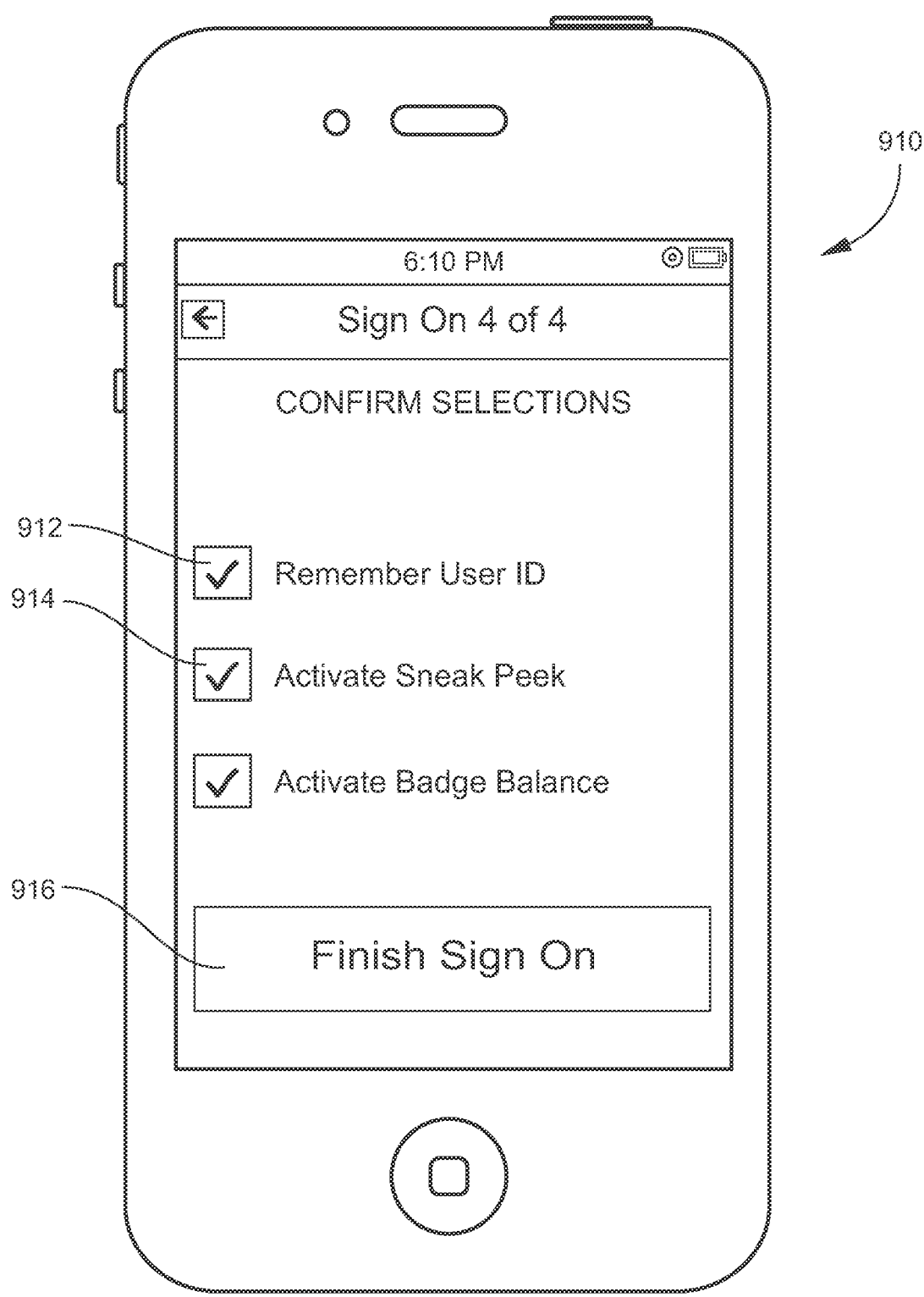

FIG. 9D shows an example of a confirm preferences mobile device screen shot 910 for embodiments of the invention. When the customer opts in, he or she may be taken to the confirm preferences screen 910 where the customer may confirm his or her preferences with his or her user ID remembered 912 and the sneak peek functionality enabled 914. When the customer is comfortable with his or her settings, the customer may click on "finish sign-on" 916 to confirm his or her settings. Once the customer's settings are confirmed, the customer may be taken to the home screen of the sneak peak application for embodiments of the invention, at which point the customer is fully signed in and able to view and perform all functions within the application for embodiments of the invention.

Figure 10:
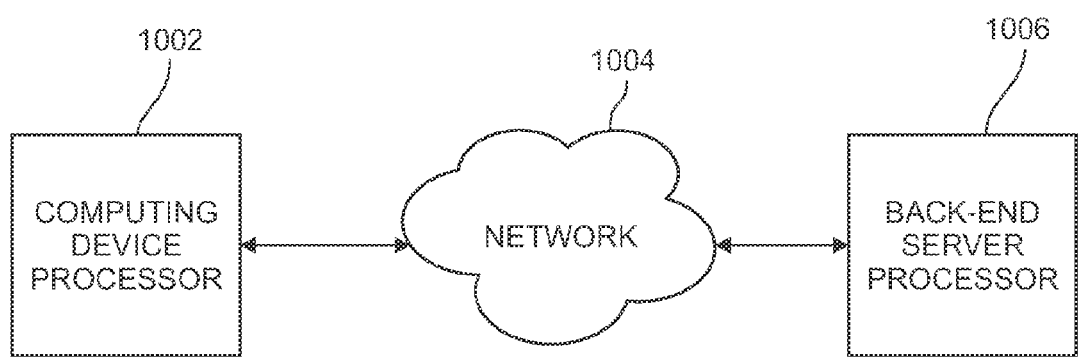
FIG. 10 is a schematic diagram that illustrates an example overview of key components and the flow of information between key components for embodiments of the invention.
Figure 11:
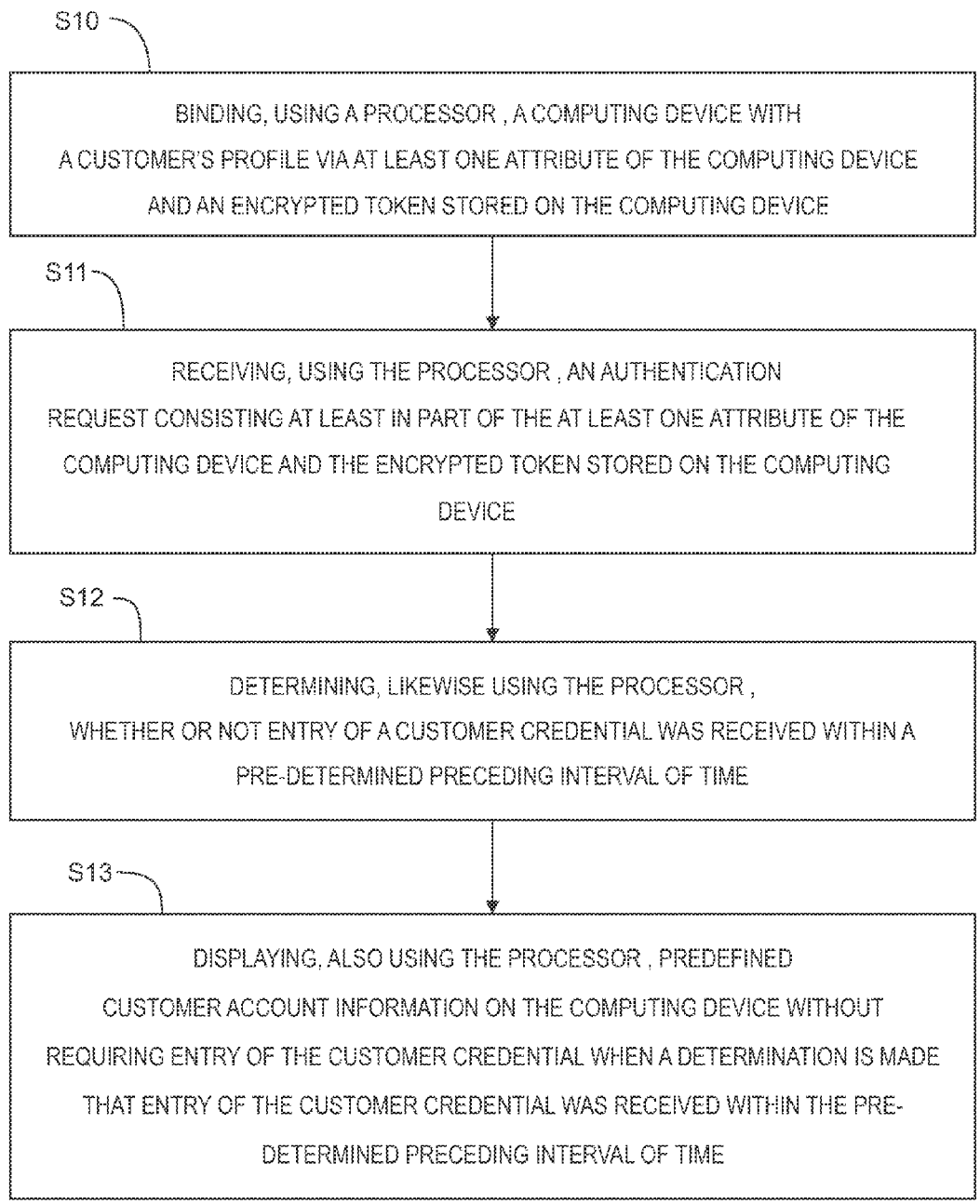
FIG. 11 is a flow chart that illustrates an example of the process of accessing customer account information using the sneak peek application for embodiments of the invention.

FIG. 10 is a schematic diagram that illustrates an example overview of key components and the flow of information between key components for embodiments of the invention. Referring to FIG. 10, key components may include, for example, a processor of a customer's computing device 1002, such as the customer's smart phone, coupled over a network 1004 to a processor of a back-end server 1006, such as a financial institution server. FIG. 11 is a flow chart that illustrates an example of the process of accessing customer account information for embodiments of the invention. Referring to FIGS. 10 and 11, at S10, using the processor of the back-end server 1006, the computing device 1002 may be bound with a customer's profile via at least one attribute of the computing device 1002 and an encrypted token stored on the computing device 1002.

Referring further to FIGS. 10 and 11, thereafter, at S11, likewise using the processor of the back-end server 1006, an authentication request may be received that consists at least in part of the at least one attribute of the computing device 1002 and the encrypted token stored on the computing device 1002. At S12, again using the processor of the back-end server 1006, a determination may be made of whether or not entry of a customer credential was received within a pre-determined preceding interval of time. At S13, also using the processor of the back-end server 1006, predefined customer account information may be displayed on the computing device 1002 without requiring entry of the customer credential when a determination is made that entry of the customer credential was received within the pre-determined preceding interval of time.

Customers who do not opt in during the first sign-on may be prompted with the sneak peek functionality opt-in screen a pre-determined period of time, such as 60 days, after first login. Customers who opt in either during the first sign in or via settings may land immediately on the home screen and be able to access the level of information allowed within the sneak peek functionality every time he or she opens the sneak peak application for embodiments of the invention within a predefined period of time, such as the first fifteen days, of enrolling. As previously noted, as a security measure, the customer will be asked to enter his or her password at least once every predetermined time interval, such as every fifteen days. If the customer shuts down the sneak peak application for embodiments of the invention, the next time the customer seeks to access his or her information, a verification of the token and refreshing of the account information may be occur. In addition, when the sneak peak application is running in the background and is brought to the foreground by the customer, a verification of the token and refreshing of the account information may likewise occur It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for accessing customer account information, comprising: binding, using a processor, a computing device with a customer's profile via at least one attribute of the computing device and an encrypted token stored on the computing device; receiving, using the processor, an authentication request consisting at least in part of the at least one attribute of the computing device and the encrypted token stored on the computing device; determining, using the processor, whether or not entry of a customer credential was received within a pre-determined preceding interval of time; and displaying, using the processor, predefined customer account information limited to non-personally identifiable customer account information consisting at least in part of a pre-determined portion of an account number and at least in part of an account balance on the computing device without receiving an authentication request consisting at least in part of the customer credential when a determination is made that entry of the customer credential was received within the pre-determined preceding interval of time; wherein determining whether or not entry of the customer credential was received further comprises determining whether or not entry of the customer credential was received at least once within the preceding fifteen days.

2. The method of claim 1, wherein binding the computing device further comprises binding the computing device with the customer's profile only when an opt in selection is received from the customer.

3. The method of claim 2, wherein binding the computing device further comprises binding the computing device only if a confirmation of the opt in selection is received from the customer.

4. The method of claim 2, wherein binding the computing device further comprises disabling the binding of the computing device at any time an opt out selection is received from the customer after receiving the opt in selection from the customer.

5. The method of claim 2, wherein binding the computing device further comprises disabling the binding of the computing device at any time a request to change the customer credential is received from the customer.

6. The method of claim 1, wherein the customer credential comprises a customer password.

7. The method of claim 2, wherein binding the computing device further comprises disabling the binding of the computing device at any time a request is received to bind a different computing device with the customer's profile.

8. The method of claim 1, wherein the at least one computing device attribute comprises a unique computing device identifier.

9. The method of claim 1, wherein the computing device comprises a mobile communication device and the at least one computing device attribute further comprises mobile network details.

10. The method of claim 1, wherein the encrypted token comprises a token encrypted using a hash algorithm.

11. The method of claim 1, wherein determining whether or not entry of the customer credential was received further comprises determining whether or not entry of the customer credential was received at least once within the pre-determined preceding interval of time.

12. The method of claim 1, wherein displaying the non-personally identifiable customer account information further comprises displaying non-personally identifiable customer checking, savings, and credit card account information on the computing device.

13. The method of claim 12, wherein displaying the non-personally identifiable customer checking account information further comprises displaying a partial checking account identifier and one or more available balances of the checking account on the computing device.

14. The method of claim 13, wherein the partial checking account identifier comprises a pre-determined portion of a checking account number.

15. The method of claim 12, wherein displaying the non-personally identifiable customer savings account information further comprises displaying a partial savings account identifier and one or more savings account balances on the computing device.

16. The method of claim 15, wherein the partial savings account identifier comprises a pre-determined portion of a savings account number.

17. The method of claim 12, wherein displaying the non-personally identifiable customer credit card account information further comprises displaying a partial credit card account identifier, one or more credit card balances on the computing device.

18. The method of claim 17, wherein the partial credit card account identifier comprises a pre-determined portion of a credit card account number.

19. The method of claim 1, wherein displaying the non-personally identifiable customer account information further comprises displaying non-personally identifiable customer account transaction information for a pre-determined number of transactions on the computing device.

20. The method of claim 19, wherein the pre-determined number of transactions comprises the most recent fifteen transactions.

21. The method of claim 1, wherein displaying the pre-defined customer account information further comprises denying a customer transaction request received without entry of the customer credential.

22. A system for accessing customer account information, comprising: a processor coupled to memory, the processor being programmed for: binding a computing device with a customer's profile via at least one attribute of the computing device and an encrypted token stored on the computing device; receiving an authentication request consisting at least in part of the at least one attribute of the computing device and the encrypted token stored on the computing device; determining whether or not entry of a customer credential was received within a pre-determined preceding interval of time; and displaying predefined customer account information limited to non-personally identifiable customer account information consisting at least in part of a pre-determined portion of an account number and at least in part of an account balance on the computing device without receiving an authentication request consisting at least in part of the customer credential when a determination is made that entry of the customer credential was received within the pre-determined preceding interval of time; wherein determining whether or not entry of the customer credential was received further comprises determining whether or not entry of the customer credential was received at least once within the preceding fifteen days.

* * * * *